(12) United States Patent
Anhorn

(10) Patent No.: US 6,201,620 B1
(45) Date of Patent: Mar. 13, 2001

(54) TEST METHOD FOR A NETWORK ELEMENT OF AN OPTICAL COMMUNICATION SYSTEM AND NETWORK ELEMENT THEREFOR WITH TEST MODULE

(75) Inventor: Jürgen Anhorn, Kornwestheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/047,047

(22) Filed: Mar. 24, 1998

(30) Foreign Application Priority Data

Mar. 26, 1997 (DE) .............................................. 197 12 750

(51) Int. Cl.[7] .......................... H04B 10/08; H04J 14/00; H04J 14/08
(52) U.S. Cl. ......................... 359/110; 359/117; 359/128; 359/139
(58) Field of Search .................................. 359/117, 124, 359/180, 110, 128, 127, 161

(56) References Cited

U.S. PATENT DOCUMENTS

| | | | |
|---|---|---|---|
| 5,058,103 | 10/1991 | Shimizu | 359/124 |
| 5,299,293 * | 3/1994 | Mestdagh et al. | 359/110 |
| 5,589,683 | 12/1996 | Nakai | 250/214 |
| 5,903,371 * | 5/1999 | Arecco et al. | 359/119 |
| 6,005,694 * | 12/1999 | Liu | 359/110 |

FOREIGN PATENT DOCUMENTS 1208815  7/1986  (CA).

* cited by examiner

*Primary Examiner*—Leslie Pascal
*Assistant Examiner*—Dalzid Singh

(57) ABSTRACT

A network element (NE) of an optical communication system includes of a chassis into which different modules (D1–D3, S1–S8, X1–X12) and at least one auxiliary module (DS, SS) can be inserted, wherein the modules are optically connected via optical waveguides. Some of the modules (D1–D3, DS, S1–S8, SS) include at least one laser. There is also provided a method automatically testing these optical connections by sequentially switching the lasers of the modules (D1–D3, DS, S1–S8, SS) off and on, and by measuring on the subsequent modules with the help of detectors (DET) which are located in the modules (S1–S8, SS, X1–X12) and have optical inputs (PORT1, PORT2), whether a signal loss has occurred. A memory in the network element (NE) can also include a program module which can be implemented in a control device with a microprocessor, for executing the test method.

7 Claims, 8 Drawing Sheets

TEST METHOD FOR A NETWORK ELEMENT OF AN OPTICAL COMMUNICATION SYSTEM AND NETWORK ELEMENT THEREFOR WITH TEST MODULE

BACKGROUND OF THE INVENTION

1. Technical Field

The invention relates to a method for testing the optical connections of modules of a network element provided for an optical communication system.

2. Discussion of Related Art

Network elements of this type generally consist of a chassis in which, depending on the design and the intended application, a variety of modules can be inserted which are electrically connected with each other by way of a bus system located on the backside of the chassis, sometimes called the backplane. The optical connections between the individual modules are usually implemented via optical waveguides (optical fibers). Such a network element typically also includes a control module for receiving alarm messages from all modules and for transmitting control commands to specified individual modules via the backplane bus system.

Advantageously, the reliability of such a network element can be enhanced by adding auxiliary modules to certain types of modules which are susceptible to malfunction, and by connecting these auxiliary modules to the other modules via an optical cross-connect switch. To ensure that such a back-up connection employing the auxiliary modules operates properly in the event of a malfunction, the optical connections between all modules which are provided, as mentioned above, by individual optical waveguides, have to be known exactly.

SUMMARY OF INVENTION

It is therefore an object of the invention to provide a method for testing the optical connections between modules of a network element, so that the connections between the modules can be traced and determined even when the network element is already installed. It is another object of the invention to provide a network element for carrying out the test method.

According to a first aspect of the invention, a method for testing optical connections between modules of a network element for an optical communication system, wherein the optical network element comprises several modules and at least one auxiliary module which are connected with each other via optical waveguides and wherein at least some modules each comprise a laser, is characterized in that the modules have optical inputs with detectors adapted to test the presence of an optical signal at the input, and that for testing purposes, the lasers of the modules are sequentially switched off and on and the subsequent (downstream) modules are checked to determine if a signal loss has occurred.

According to a second aspect of the invention, a network element for an optical communication system, wherein the network element comprises several modules and at least one auxiliary module, which are connected with each other through optical waveguides and wherein at least some of the modules each include a laser, is characterized in that the modules which have optical inputs, also have detectors for testing if an optical signal is present, and that a memory of the network element contains a program module with a program for testing the optical connections between the modules wherein the program module, when implemented in a form of a microprocessor in a controller of the network element, addresses the modules in such a way that for performing the test, the lasers of the modules are sequentially switched off and on and the subsequent modules are checked for a signal loss.

The test method of the invention has the advantage that periodic alarm messages from individual modules which may be transmitted every 10 sec, do not influence or disturb the test results.

Moreover, with the test method of the invention, the time periods during which the components are momentarily switched off, can advantageously be kept very short. Consequently, the time periods during which the outputs are switched off, are also very short. Most advantageously, with the test method of the invention, a partially configured network element, i.e., a network element having expansion slots available for additional modules, can be expanded during operation without disturbing the operation.

These and other objects, features and advantages of the present invention will become more apparent in light of the detailed description of a best mode embodiment thereof, as illustrated in the accompanying drawing.

DETAILED DESCRIPTION OF PREFERRED EMBODIMENTS

Figure 1:
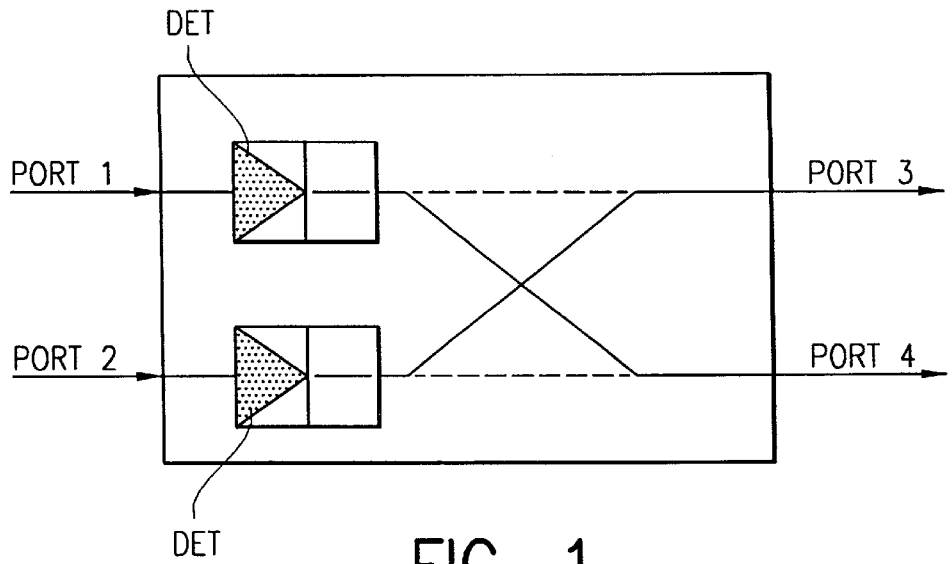
FIG. 1 shows a first module "optical cross-connect switch"

Referring now to FIG. 1, there is illustrated an optical cross-connect switch which is incorporated in the form of a module in a network element of the embodiment. The cross-connect switch has two inputs PORT1, PORT2, which can be connected to two outputs PORT3 and PORT4, either crossed or not crossed. At the two inputs PORT1, PORT2 there are provided detector devices DET for determining if and at which input an optical signal is present. The detector devices DET can, for example, be photodiodes which are coupled to the input via couplers.

The switch is shown in the crossed position, with the input PORT1 connected to the output PORT4 and the input PORT2 connected to the output PORT3. The un-crossed switch position is indicated by dotted lines. The optical cross-connect switch can transmit the following alarm signals to a control device: "Signal at PORT X OK" and "No signal present at PORT Y" (wherein X, Y refer to PORT1 and PORT2, respectively). The optical cross-connect switch can receive the following commands from the control device: "Switch position crossed!" and "Switch position not crossed!".

Figure 2:
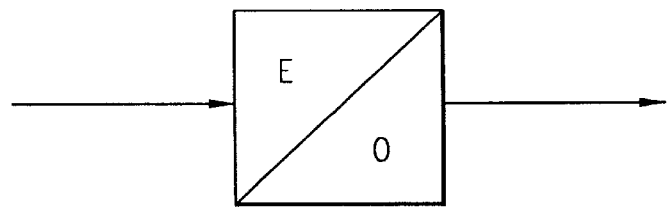
FIG. 2 shows a second module "optical transmitter"

A second module used in the network element of the exemplary embodiment is shown in FIG. 2. This module is an optical transmitter capable of converting electrical input signals into optical output signals with the help of a laser. There is no alarm to be transmitted by the optical transmitter to the control device. The control device can transmit the following commands to the optical transmitter: "Laser on!" and "Laser off!".

Figure 3:
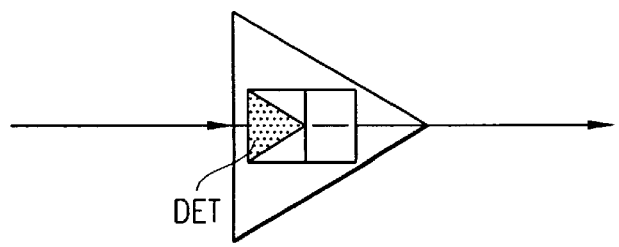
FIG. 3 shows a third module "optical amplifier"

A third module used in the network element of the embodiment is an optical amplifier which is illustrated in FIG. 3. The optical amplifier amplifies the optical output signals received from the optical transmitters. Like the optical cross-connect switch, the amplifier includes a detection device DET for monitoring the optical input signals. Possible alarms of the optical amplifier are: "Signal present at input" and "No signal present at input".

The optical amplifier includes a laser, for example a pumped laser for an optically active waveguide section. The optical amplifier can be, for example, an erbium-doped fiber amplifier, or a semiconductor amplifier. The control device can therefore transmit the following commands to the optical amplifier: "Laser on!" and "Laser off!".

Figure 4:
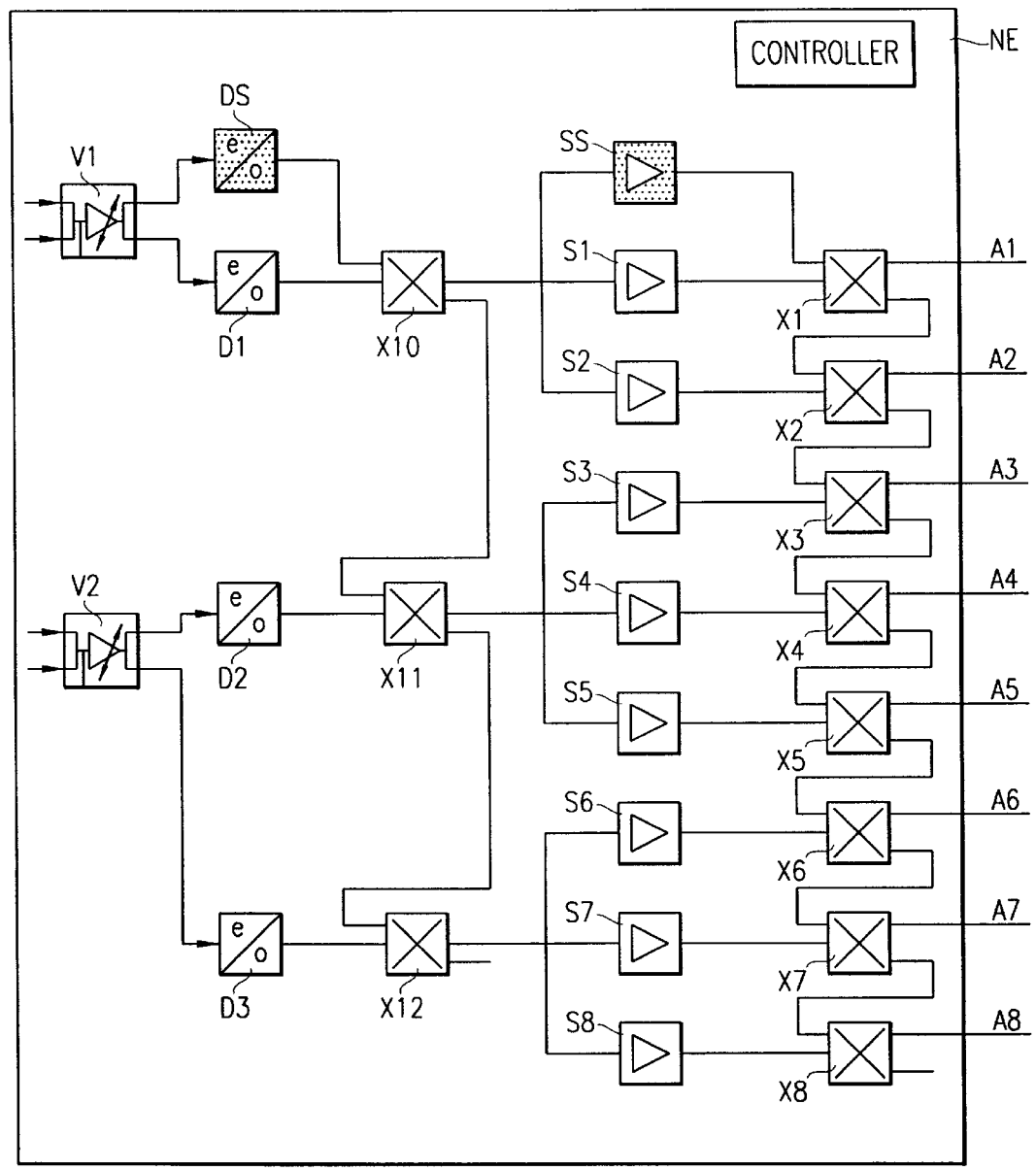
FIG. 4 shows a schematic circuit diagram of a network element constructed from various modules, with additional auxiliary modules.

The network element NE of the embodiment is illustrated in FIG. 4 and includes four modules D1–D3, DS of the optical transmitter type (FIG. 2), which are connected by way of optical waveguides via three modules X10–X12 of the optical cross-connect switch type (FIG. 1) to nine modules S1–S8, SS of the optical amplifier type (FIG. 3). The nine optical amplifiers S1–S8, SS are connected by way of additional optical waveguides via eight additional optical cross-connect modules X1–X8 to eight outputs A1–A8 of the network element. The optical transmitters D1–D3, DS are controlled by electric preamplifiers V1, V2. A controller is also shown which is interconnected to the various modules shown, with control lines which are not shown so as to avoid cluttering the drawing.

One of the four optical transmitters is provided in the form of an auxiliary module DS, as is one of the nine optical amplifiers SS. These two auxiliary modules DS, SS are deactivated during normal operation of the network element NE, i.e., the lasers in these auxiliary modules are switched off. This is indicated in FIG. 4 by shading the background of the two auxiliary modules DS, SS gray. If there is no malfunction, all optical cross-connect switches X1–X12 of the depicted circuit are in the crossed position.

Figure 5:
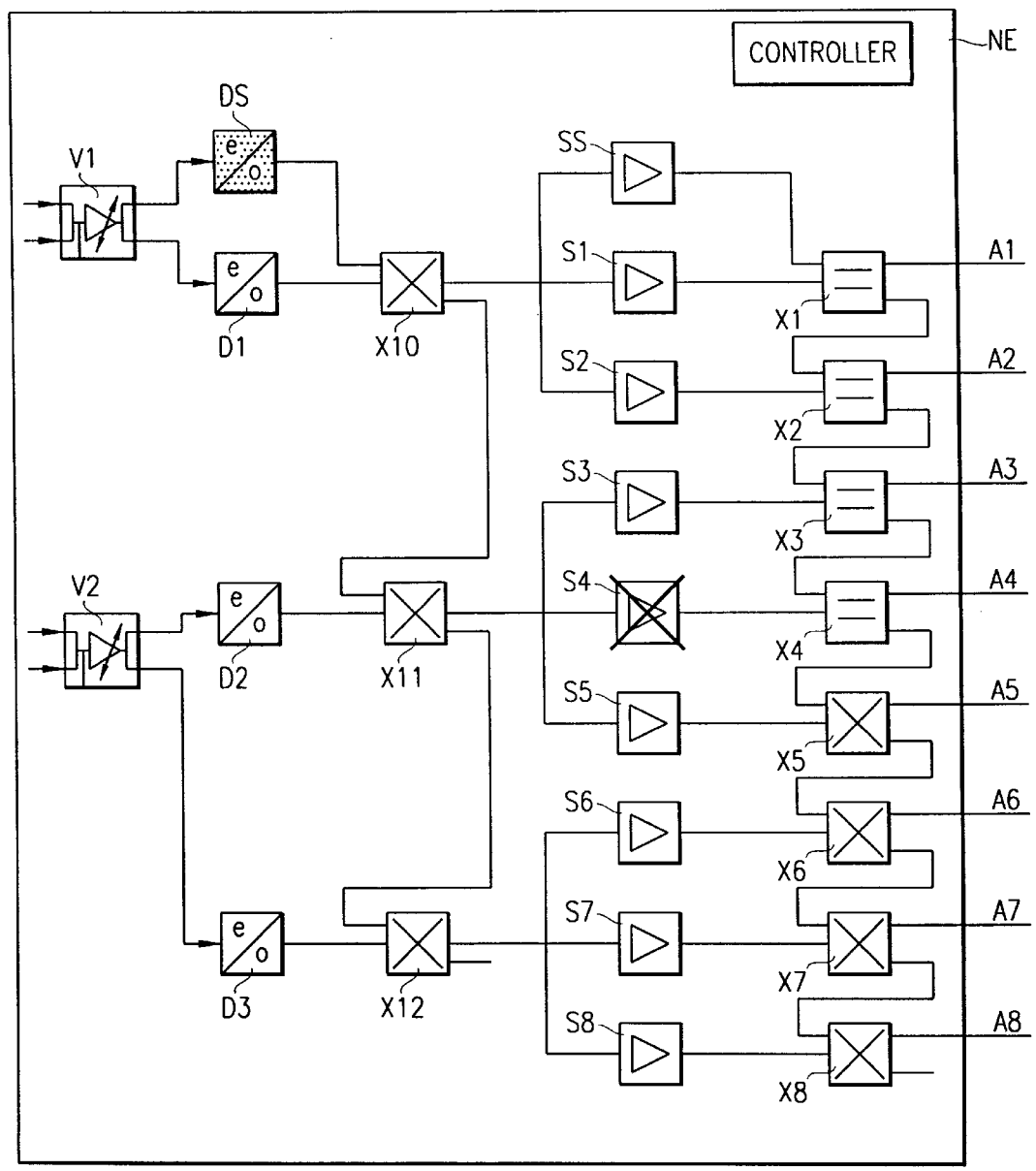
FIG. 5 shows the network element of FIG. 4, with an alternate circuit put in service after a malfunction.

Illustrated in FIG. 5 is the state of the network element NE in the event of a malfunction. The optical amplifier S4 has failed, and the network element NE has thus switched over to an alternate circuit incorporating the optical amplifier SS which is provided as an auxiliary module. As depicted in FIG. 5, the optical cross-connect switches X1–X4 then have to be switched over to the un-crossed switch position and the auxiliary module SS has to be activated.

In order to determine which optical cross-connect switches have to be switched over in the event of a malfunction, the connections between all modules have to be known in detail. The modules are, for example, in the form of plug-ins inserted in a common chassis of the network element NE; their physical location can be pinpointed uniquely by the controller based on a slot number and a module support number. The optical connections via the optical waveguides are, however, set up without regard to of the physical location. With the test method of the invention, the physical location in the chassis can be associated with the logical location in the circuit diagram illustrated in FIGS. 4 and 5.

According to the invention, the lasers of the modules are successively momentarily off and then on again, and the subsequent modules are tested with the help of the detector devices located at the optical inputs to determine if a signal loss has occurred.

Figure 6:
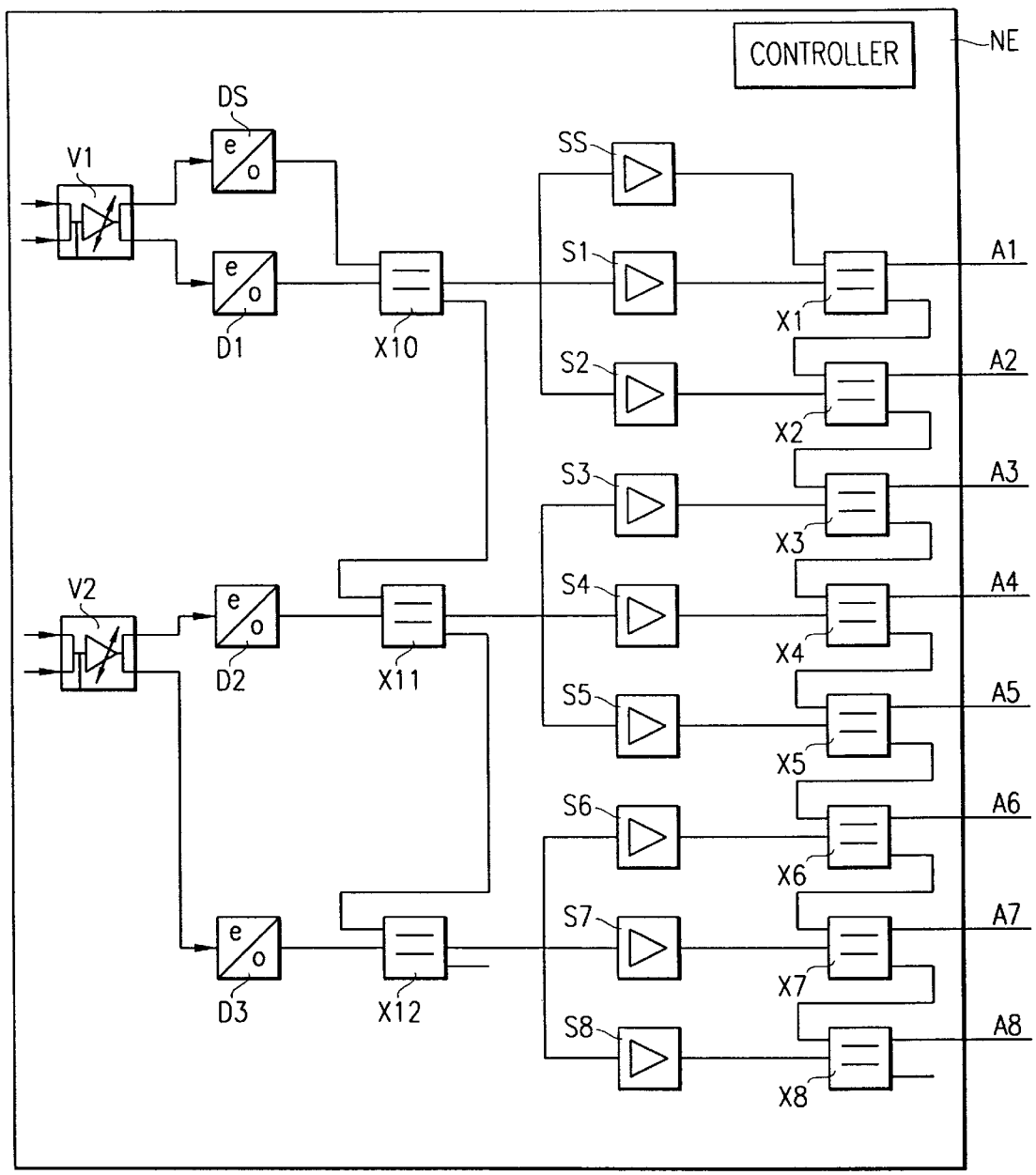
FIG. 6 shows the network element of FIG. 4 in the initial state for the test method.

The initial state for the test method of the network element NE is illustrated in FIG. 6. All optical cross-connect switches X1–X12 are here switched into the un-crossed position, and all lasers of the optical transmitters D1–D3, DS and of the optical amplifiers S1–S8, SS are switched on. After these steps, the state described in Table 1 is attained:

TABLE 1

Initial state for the test method

|  | Command | Alarm |  |
| --- | --- | --- | --- |
| all optical transmitters | Laser on | — | — |
| all optical amplifiers | Laser on | Signal OK |  |
| all optical cross-connect switches | un-crossed switch position | Signal PORT1 OK | Signal PORT2 OK |

Thereafter, the following substeps are performed for each of the optical amplifiers S1–S8, SS: The laser of the respective optical amplifier is switched off; a test is then performed to determine which of the optical cross-connect switches indicates a signal loss and at which of the input ports the signal loss occurs. In the network element NE of the embodiment, this can be either a single optical cross-connect switch or two cross-connect switches. The optical cross-connect switches which indicate a signal loss, are then listed in a table. Thereafter, the laser of the respective optical amplifier is switched on again, and the process is continued with the next optical amplifier.

Figure 7:
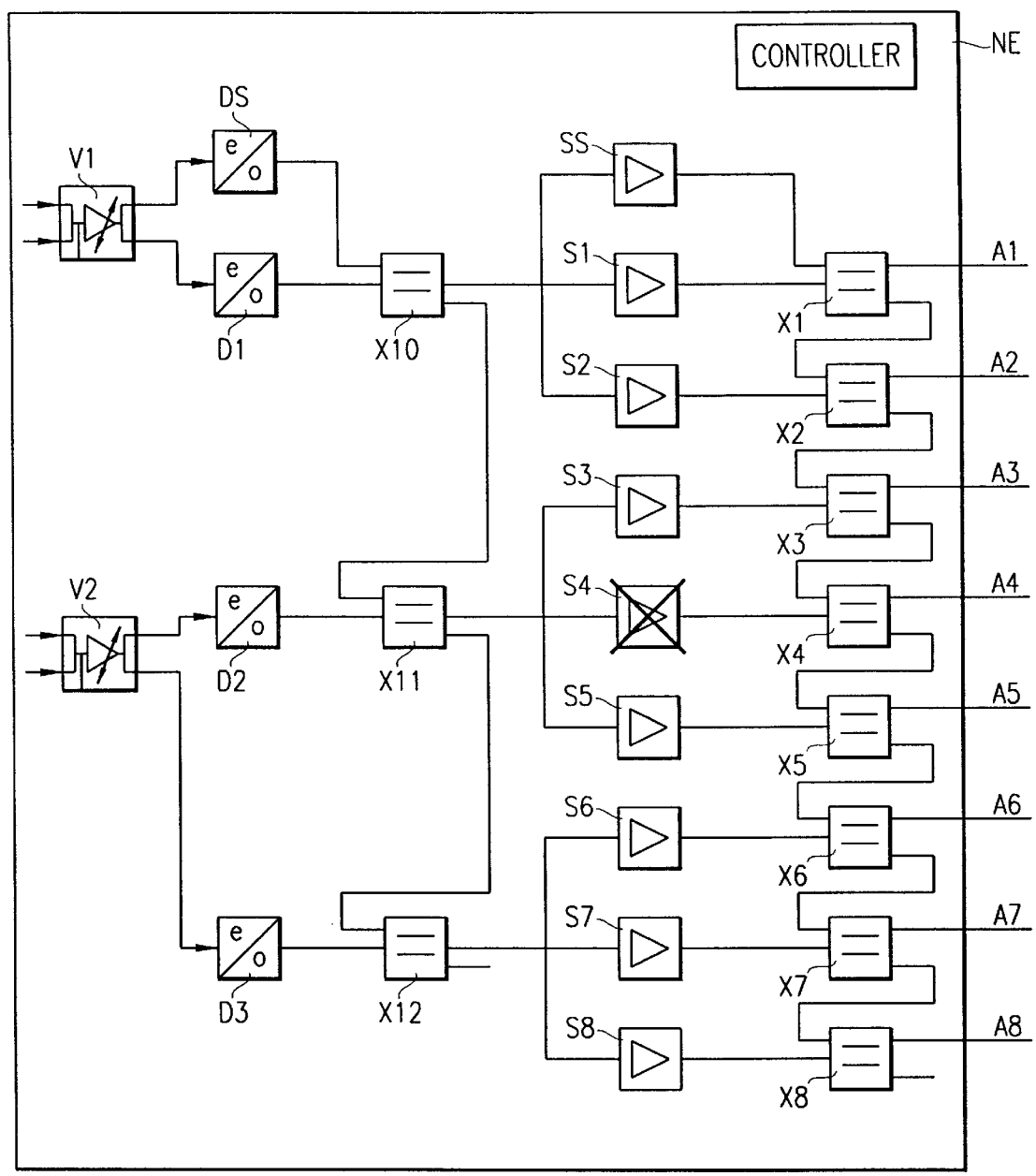
FIG. 7 shows the network element of FIG. 4 during a first phase of the test method.

Referring now to FIG. 7, there is shown the network element NE during one of the test steps. The laser of the optical amplifier S4 is switched off. The optical cross-connect switch X4 then indicates a signal loss at the second input PORT2 and the optical cross-connect switch X5 indicates a signal loss at its first input PORT1. In the table, this information is entered in the row corresponding to the amplifier S4, together with the physical location of the amplifier S4. After the test steps for all optical amplifiers have been completed, the following table is obtained:

TABLE 2

Test results following the test steps for the optical amplifiers S1–S8, SS

| physical location of the optical amplifiers S1–S8, SS | optical cross-connect switch with signal loss at PORT1 | optical cross-connect switch with signal loss at PORT2 |
| --- | --- | --- |
| P_Sa | P_Xa | — |
| P_Sb | P_Xb | P_Xa |
| P_Sc | P_Xc | P_Xb |
| P_Sd | P_Xd | P_Xc |
| P_Se | P_Xe | P_Xd |
| P_Sf | P_Xf | P_Xe |

TABLE 2-continued

Test results following the test steps for
the optical amplifiers S1–S8, SS

| physical location of the optical amplifiers S1–S8, SS | optical cross-connect switch with signal loss at PORT1 | optical cross-connect switch with signal loss at PORT2 |
|---|---|---|
| P_Sg | P_Xg | P_Xf |
| P_Sh | P_Xh | P_Xg |
| P_Si | — | P_Xh |

P_Sa–P_Si refer to the physical locations of the optical amplifiers S1–S8, SS, which are, of course, uniquely identified by the slot number of the network element NE, and P_Xa–P_Xh refer to the physical locations of the optical cross-connect switches X1–X8.

The test results are evaluated as follows: It is known, that only the optical amplifier SS which is the auxiliary module connected to the optical cross-connect switch X1, does not cause a signal loss at any second input PORT2 of a cross-connect switch. Accordingly, the entry has to be located in the table where none of the cross-connect switches indicates a signal loss at PORT2. This result confirms that the optical amplifier SS has the physical location P_Sa and that the optical cross-connect switch X1 has the physical location P_Xa.

Thereafter, the entry in the table is located where the cross-connect switch X1 with the location P_Xa indicates a signal loss at PORT2. The association of the optical amplifier S1 with the physical location P_Sb and of the cross-connect switch X2 with the location P_Xb is thereby confirmed. In the same manner, the next cross-connect switch and the next amplifier are identified by locating in the table the entry where the cross-connect switch X2 with the location P_Xb indicates a signal loss at PORT2. Based on this entry, the cross-connect switch X3 can then be associated with the location P_Xc and the amplifier S2 with the location P_Sc. This process is continued until all eight cross-connect switches X1–X8 and all amplifiers S1–S8, SS are identified, i.e., are associated with a physical location. This concludes the first phase of the test method.

In a subsequent step, the so identified optical cross-connect switches X1–X8 are switched over to the crossed position and the optical amplifier SS which is provided as an auxiliary module, is switched off. The un-crossed switch position can now serve as a filter for the optical cross-connect switches X10–X12 which have not yet been identified.

In a second phase of the test method, the following substeps are performed for each optical transmitter D1–D3, DS: The laser of the respective optical transmitter is switched off and a test is performed to determine which optical cross-connect switch indicates a signal loss and at which of the input ports the signal loss occurs. It has to be noted that only those optical cross-connect switches are taken into consideration which have not yet been identified, i.e., which are still in the un-crossed switch position. The optical cross-connect switches reporting a signal loss are entered into a table. Likewise, the optical amplifiers reporting a signal loss are entered into the table. Subsequently, the laser of the respective optical transmitter is switched on again and the process is continued with the next optical transmitter.

Figure 8:
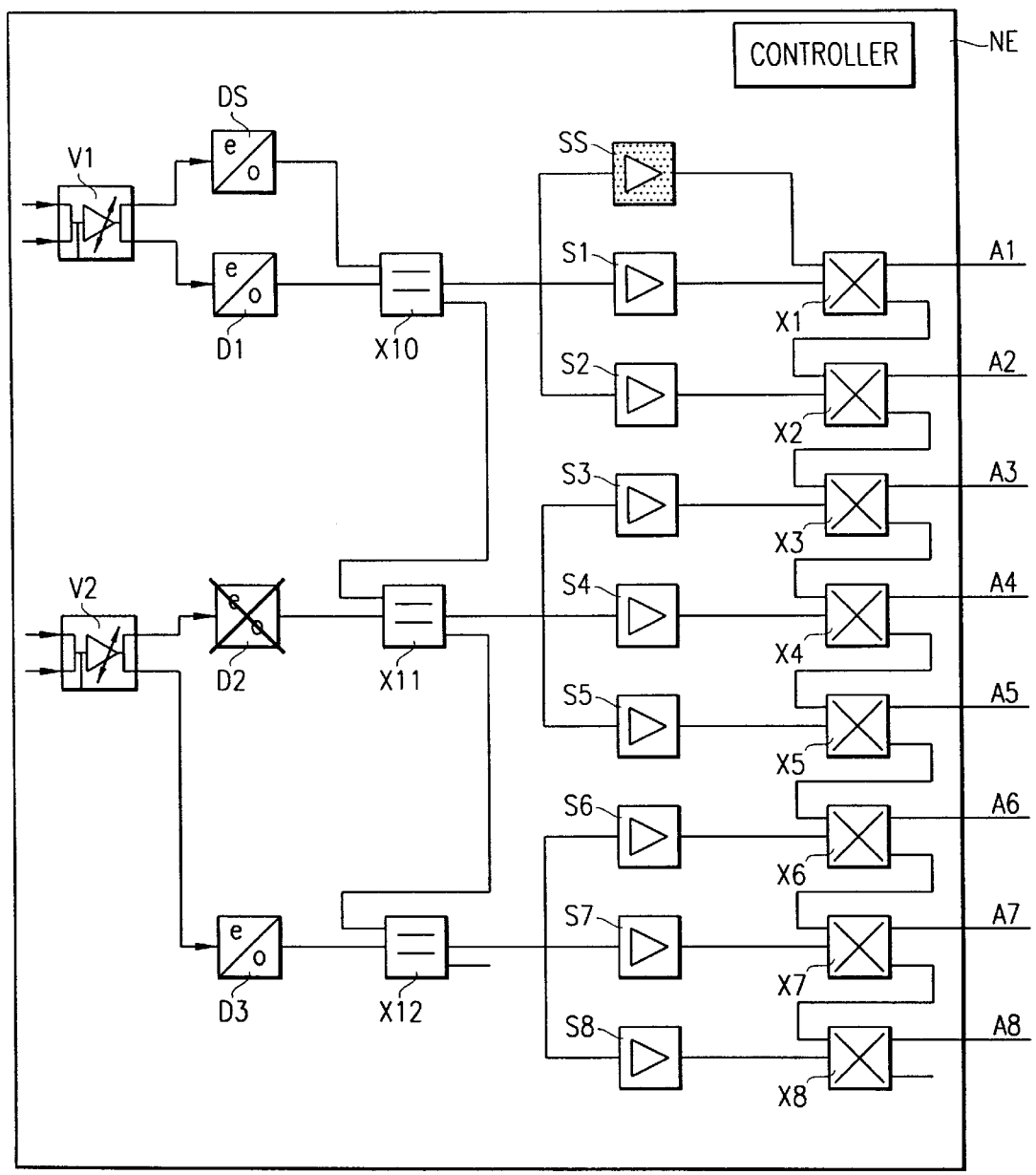
FIG. 8 shows the network element of FIG. 4 during a second phase of the test methods.

In FIG. 8 there is shown the network element NE of the embodiment during the aforedescribed second phase. The optical cross-connect switches X1–X8 are in the crossed switch position and the optical amplifier SS is switched off.

The laser of the optical transmitter D2 is also switched off. The optical cross-connect switch X1 therefore reports a signal loss at its second input PORT2, and the optical cross-connect switch X12 reports, that there is no signal present at PORT1. After the test steps for all optical transmitters have been completed, the following table is obtained:

TABLE 3

Test results following the test steps for
the optical transmitters D1–D13, DS

| physical location of the optical transmitter | cross-connect switch with signal loss at PORT1 | cross-connect switch with signal loss at PORT2 | optical amplifier with signal loss |
|---|---|---|---|
| P_Da | P_Xm | — | SS, S1, S2 |
| P_Db | P_Xn | P_Xm | S3, S4, S5 |
| P_Dc | P_Xo | P_Xn | S6, S7, S8 |
| P_Dd | — | P_Xo | — |

P_Da–P_Dd refer to the physical locations of the optical transmitters D1–D3, DS and P_Xm–P_Xo refer to the physical locations of the optical cross-connect switches X10–X12.

The test results of the second phase are evaluated as follows: It is known, that only the optical transmitter DS which is provided as an auxiliary module, in conjunction with the cross-connect switch X10 does not produce a signal loss at any of the second inputs PORT2. Accordingly, in the table the entry is located where no cross-connect switch reports a signal loss at PORT2. This result confirms that the optical transmitter DS has the physical location P_Da, and that the optical cross-connect switch X10 has the physical location P_Xm.

Thereafter, the entry in the table is located where the cross-connect switch X10 with the location P_Xm indicates a signal loss at PORT2. The association of the optical transmitter D1 with the physical location P_Db and of the cross-connect switch X1 to the location P_Xn is thereby confirmed. In the same manner, the next cross-connect switch and the next amplifier are identified by locating in the table the entry where the cross-connect switch X11 with the location P_Xn indicates a signal loss at PORT2. Based on this entry, the cross-connect switch X12 can then be associated with the location P_Xo and the amplifier D2 with the location P_Dc. Based on the entry in the last row of the table, where the optical cross-connect switch X12 at position P_Xo indicates a signal loss at PORT2, D3 is associated with P_Dd. All optical transmitters D1–D3, DS and all optical cross-connect switches X10–X12 are thus identified, i.e., associated with the physical location in the chassis of the network element NE.

In addition, a test can also be performed to determine if for each of the optical transmitters DS, D1, D2 three optical amplifiers report a signal loss at the same time. If this is not the case, then the network element of the present embodiment NE may be only partially configured, or an optical connection between the modules may be faulty.

To reestablish operability after all tests have been completed, all cross-connect switches are switched over to the crossed position and the optical transmitter DS which is provided as an auxiliary module, is deactivated.

Auxiliary modules in a network element are preferably connected via optical cross-connect switches which enable particularly rapid and robust switching from normal operation to an alternate connection. The test method of the invention can also be used with other switches, for example with optical change-over switches or with simple optical on/off-switches.

Figure 9:
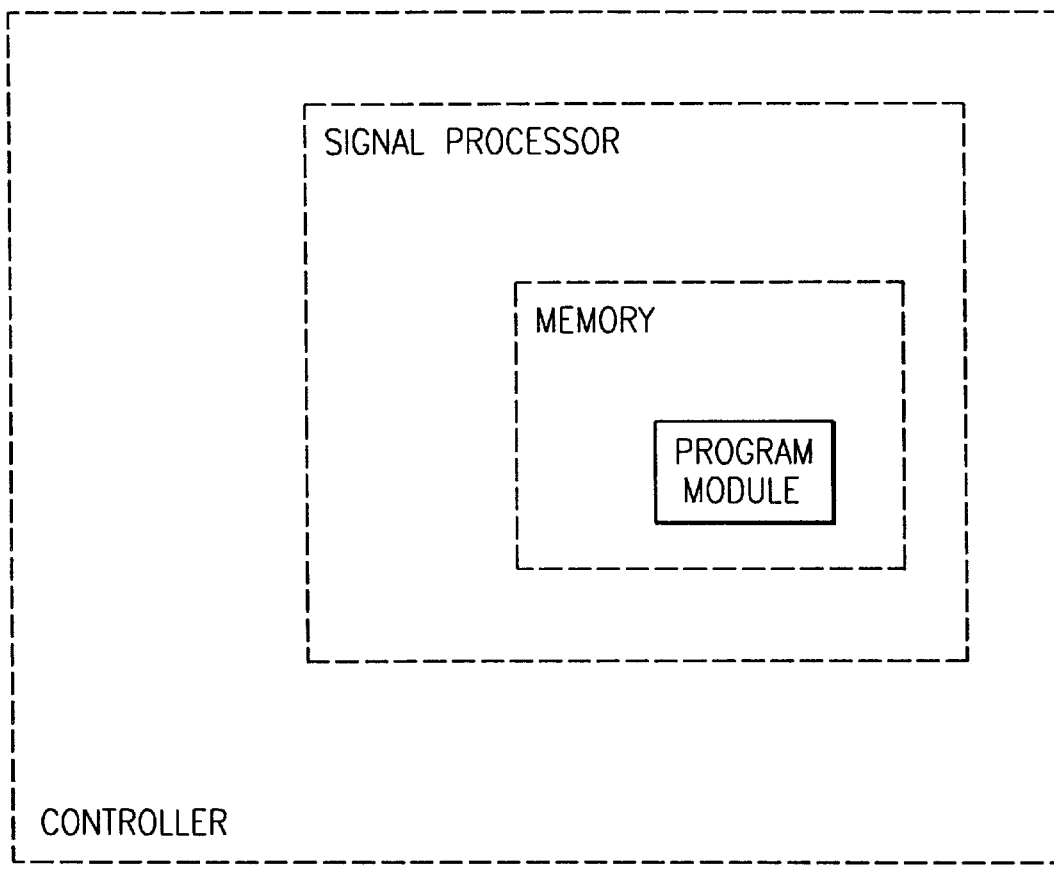
FIG. 9 shows a controller of the network element of FIGS. 4–8.
Figure 10:
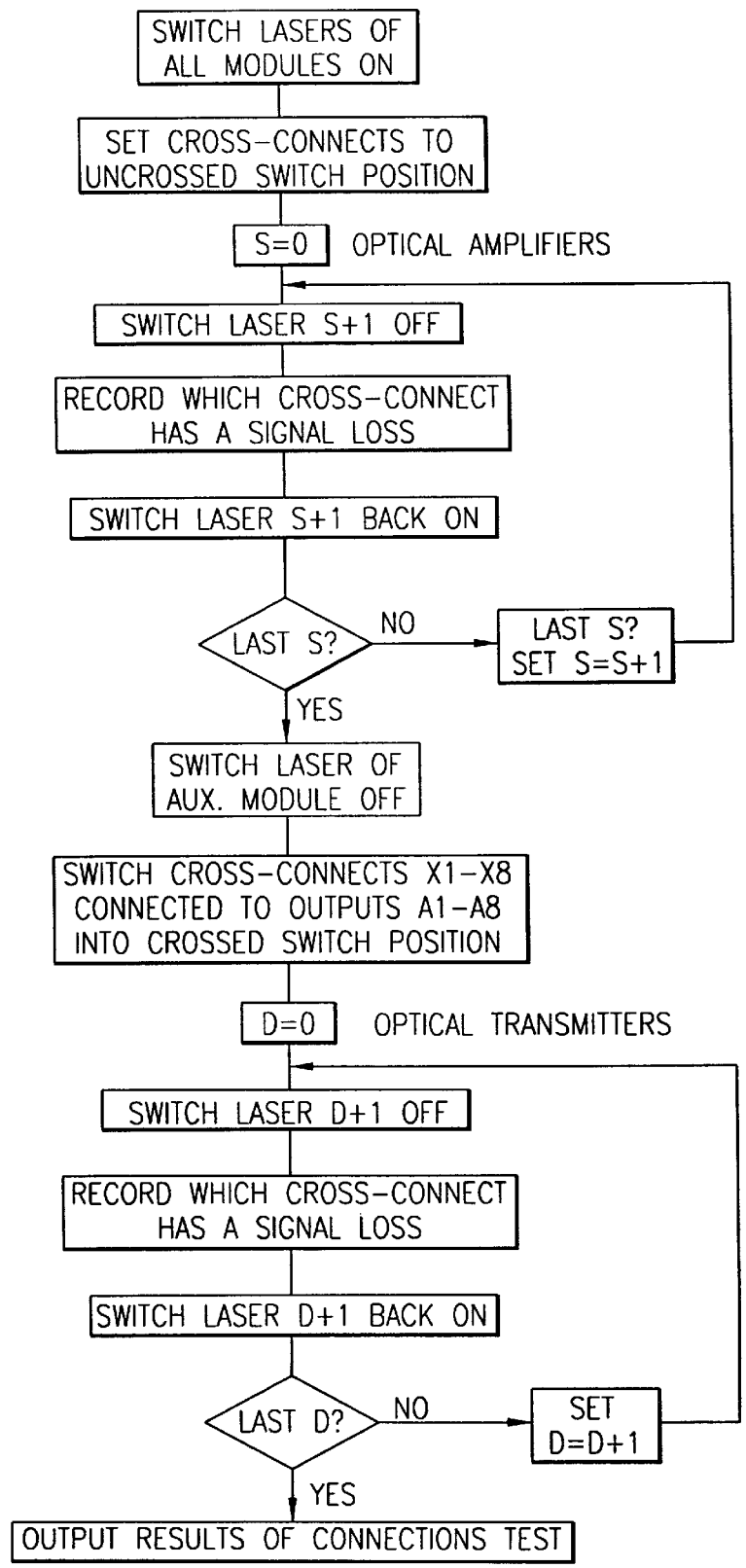
FIG. 10 is a flowchart of the method of tracing signal paths and verifying connections among the optical elements.

Most advantageously, a control device such as the controller of FIG. 9 of the network element NE can be provided with a memory including a program module, wherein the program module which can be implemented in the control device as part of a signal processor, executes the test method, switches the lasers of the individual modules off and then on again, and monitors, records and processes the alarm messages from the subsequent modules. In this way, the test method can be started remotely via the communication system. The program module is advantageously stored in a read-only memory, for example in an EPROM or an EEPROM. If the control device utilizes a signal processor including a microprocessor, it will also include a typical configuration for same including the microprocessor (CPU) interconnected by various data, address and control buses to at least one input/output (I/O) device, timing devices, various memory devices including the afore-mentioned read-only memory as well as random access memory and other registers, etc., as will be known to any person of skill in the art.

The network element NE can be a network element for an SDH system or for a SONET system (SDH: Synchronous Digital Hierarchy, SONET: Synchronous Optical Network), for example a cross-connect, a line multiplexer or an add/drop-multiplexer. The network element NE, however, can also be a transmitter for an optical distribution network with bi-directional or unidirectional communication.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A Method of testing and tracing optical connections between modules (D1–D3, DS, S1–S8, SS, X1–X12) of a network element (NE) for an optical communication system, wherein the optical network element (NE) comprises several modules and at least one auxiliary module (DS, SS) which are connected with each other via optical waveguides, thereby defining respective optical signal paths, and wherein at least some modules (D1–D3, DS, S1–S8, SS) each comprise a laser for generating an optical signal, characterized in that certain of the modules (S1–S8, SS, X1–X12) have optical inputs (PORT1, PORT2) with detectors (DET) adapted to test for the presence of an optical signal at the input, and that said testing comprises the steps of sequentially switching each laser of the modules (D1–D3, DS, S1–S8, SS) off and back on, one after another, and checking the subsequent modules after each switch-off to determine if and where a loss of signal has occurred.

2. The method of claim 1, for testing optical connections between modules (D1–D3, DS, S1–S8, SS, X1–X12) of a network element (NE) comprising at least one of the following modules: an optical transmitter (D1–D3, DS), an optical amplifier (S1–S8, SS), an optical cross-connect switch (X1–X12), wherein each of the optical transmitter modules (D1–D3, DS) and each of the optical amplifier modules (S1–S8, SS) comprises a laser which is switched off and switched on for performing the test.

3. The method of claim 2, wherein the lasers of the optical transmitters (D1–D3, DS) and of the optical amplifiers (S1–S8, SS) are sequentially switched off and switched on to determine at which of the inputs (PORT1, PORT2) of an optical cross connect switch (X1–X12) a signal loss has occurred.

4. The method of claim 2, wherein the network element (NE) includes an optical amplifier (SS) and an optical transmitter (DS) in the form of auxiliary modules and wherein the following steps are carried out sequentially:

a) switching the lasers of all modules (D1–D3, DS, S1–S8, SS) on, b) switching all cross-connect switches (X1–X12) into the un-crossed switch position, c) repeating the following substeps for each optical amplifier (S1–S8, SS):
  i) switching the laser of the respective optical amplifier (S4) off,
  ii) determining the respective optical cross-connect switches (X4, X5) at which a signal loss is observed on at least one of the inputs (PORT1, PORT2) and
  iii) switching the respective laser on, d) switching the laser of the optical amplifier (DS) which is provided as an auxiliary module, off, e) switching all cross-connect switches (X1–X8) which are connected to an output (A1–A8) of the network element (NE), into a crossed switch position, f) repeating the following substeps for each optical transmitter (D1–D3, DS):
  i) switching the laser of the respective optical transmitter (D2) off,
  ii) determining the respective optical cross-connect switches (X4, X5) which are not in a crossed switch position and where a signal loss is observed on at least one of the inputs (PORT1, PORT2),
  iii) switching the respective laser on, and g) determining from the measured data the connections between the individual modules (D1–D3, DS, S1–S8, SS, X1–X12).

5. Network element (NE) for an optical communication system, wherein the network element (NE) comprises several modules (D1–D3, DS, S1–S8, SS, X1–X12) and at least one auxiliary module (SS; DS), which are connected with each other through optical waveguides and wherein at least some of the modules (D1–D3, DS, S1–S8, SS) each include a laser, characterized in that the modules (S1–S8, SS, X1–X12) which have optical inputs (PORT1, PORT2), also have detectors (DET) for testing if an optical signal is present, and that a memory of the network element (NE) contains a program module with a program which tests the optical connections between the modules (D1–D3, DS, S1–S8, SS, X1–X12) wherein the program is executed in a controller of the network element (NE), and sequentially momentarily switches off each of the lasers of the modules (D1–D3, DS, S1–SS, SS) and, after each switch-off, checks for any loss of signal in modules connected downstream of the lasers.

6. The network element of claim 5, wherein said network element (NE) includes at least one of the following components: an optical transmitter (D1–D3, DS), an optical amplifier (S1–S8, SS), an optical cross-connect switch (X1–X12), wherein each of the optical transmitter modules (D1–D3, DS) and each of the optical amplifier modules (S1–S8, SS) further comprises a laser, which is switched off and on for performing the test.

7. The network element (NE) of claim 5, wherein the program is stored in a read-only memory of the program module.

* * * * *

UNITED STATES PATENT AND TRADEMARK OFFICE
CERTIFICATE OF CORRECTION

PATENT NO.   : 6,201,620 B1                                                Page 1 of 1
DATED        : March 13, 2001
INVENTOR(S)  : J. Anhorn It is certified that error appears in the above-identified patent and that said Letters Patent is hereby corrected as shown below:

Title page,
Item [56], after line 9, please insert:
| | | |
|---|---|---|
| -- 3335674 | 10/1987 | DE |
| 3724334 | 2/1989 | DE |
| 368282 | 5/1990 | EP |
| 4306032 | 9/1994 | DE |
| 4433322 | 3/1995 | DE --. |

Item [57],
Line 3, prior to "a chassis", please cancel "of"; and

Line 8, prior to "automatically", please insert -- for --.

Column 8,
Line 52, please cancel "S1-SS" and substitute -- S1-S8 -- therefor.

Signed and Sealed this

Thirteenth Day of November, 2001

Attest:

NICHOLAS P. GODICI
Attesting Officer    Acting Director of the United States Patent and Trademark Office